(12) United States Patent
Ostebee et al.

(10) Patent No.: US 9,546,598 B2
(45) Date of Patent: *Jan. 17, 2017

(54) VARIABLE VOLUME COMBUSTOR

(71) Applicant: General Electric Company, Schenectady, NY (US)

(72) Inventors: Heath Michael Ostebee, Piedmont, SC (US); Willy Steve Ziminsky, Simpsonville, SC (US); Thomas Edward Johnson, Greer, SC (US); Christopher Paul Keener, Woodruff, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 953 days.

This patent is subject to a terminal disclaimer.

(21) Appl. No.: 13/760,090

(22) Filed: Feb. 6, 2013

(65) Prior Publication Data

US 2014/0216048 A1   Aug. 7, 2014

(51) Int. Cl.
| | | |
|---|---|---|
| *F23R 3/28* | (2006.01) | |
| *F02C 7/22* | (2006.01) | |
| *F23R 3/10* | (2006.01) | |
| *F23C 5/06* | (2006.01) | |

(52) U.S. Cl.
CPC . *F02C 7/22* (2013.01); *F23C 5/06* (2013.01); *F23R 3/10* (2013.01); *F23R 3/283* (2013.01); *F23R 3/286* (2013.01)

(58) Field of Classification Search
CPC .................................. F23R 3/28; F23R 3/326
See application file for complete search history.

(56) References Cited

U.S. PATENT DOCUMENTS

| | | |
|---|---|---|
| 3,738,106 A | 6/1973 | Stein et al. |
| 3,742,703 A | 7/1973 | Melconian |
| 3,745,766 A | 7/1973 | Melconian |
| 4,044,553 A | 8/1977 | Vaught |
| 4,365,910 A | 12/1982 | Ford |
| 4,417,846 A | 11/1983 | Elliston |
| 4,497,170 A | 2/1985 | Elliott et al. |
| 4,532,762 A | 8/1985 | Mongia et al. |
| 4,545,196 A | 10/1985 | Mongia et al. |
| 4,567,724 A | 2/1986 | Mongia et al. |
| 4,844,649 A | 7/1989 | Vandenboom |
| 5,195,853 A | 3/1993 | Dooley |
| 5,319,923 A * | 6/1994 | Leonard .................. F23C 7/06 60/39.23 |
| 5,343,697 A | 9/1994 | Johnson et al. |
| 5,404,633 A | 4/1995 | Givler |
| 5,540,056 A | 7/1996 | Heberling et al. |
| 5,551,228 A | 9/1996 | Mick et al. |
| 5,664,412 A | 9/1997 | Overton |

(Continued)

OTHER PUBLICATIONS

U.S. Appl. No. 13/471,488, filed May 15, 2012, Keener, et al.
U.S. Appl. No. 13/669,479, filed Nov. 6, 2012, Chen, et al.

*Primary Examiner* — Patrick Hamo
(74) *Attorney, Agent, or Firm* — Sutherland Asbill & Brennan LLP

(57) ABSTRACT

The present application provides a variable volume combustor for use with a gas turbine engine. The variable volume combustor may include a liner, a number of micro-mixer fuel nozzles positioned within the liner, and a linear actuator so as to maneuver the micro-mixer fuel nozzles axially along the liner.

13 Claims, 2 Drawing Sheets

(56) References Cited

U.S. PATENT DOCUMENTS

| | | | |
|---|---|---|---|
| 5,895,211 A | 4/1999 | McMillan | |
| 6,425,240 B1 | 7/2002 | Park | |
| 6,438,959 B1 | 8/2002 | Dean et al. | |
| 7,093,445 B2 | 8/2006 | Corr, II et al. | |
| 7,500,347 B2 | 3/2009 | Sanders et al. | |
| 7,661,267 B2 | 2/2010 | Pollarolo | |
| 2009/0016810 A1 | 1/2009 | Geiger et al. | |
| 2010/0175380 A1* | 7/2010 | Davis, Jr. | F23R 3/286 60/734 |
| 2011/0252805 A1* | 10/2011 | Berry | F23R 3/002 60/772 |
| 2012/0085100 A1 | 4/2012 | Hughes et al. | |
| 2012/0198851 A1 | 8/2012 | Davis, Jr. et al. | |
| 2012/0198856 A1 | 8/2012 | Uhm et al. | |

* cited by examiner

VARIABLE VOLUME COMBUSTOR

STATEMENT REGARDING FEDERALLY SPONSORED RESEARCH OR DEVELOPMENT

This invention was made with government support under Contract No. DE-FC26-05NT42643 awarded by the U.S. Department of Energy. The Government has certain rights in this invention.

TECHNICAL FIELD

The present application and the resultant patent relate generally to gas turbine engines and more particularly relate to a variable volume combustor with maneuverable micro-mixer fuel nozzles so as to vary the volumes therein without changing the overall pressure drop.

BACKGROUND OF THE INVENTION

Operational efficiency and the overall output of a gas turbine engine generally increases as the temperature of the hot combustion gas stream increases. High combustion gas stream temperatures, however, may produce higher levels of nitrogen oxides and other types of regulated emissions. A balancing act thus exists between the benefits of operating the gas turbine engine in an efficient high temperature range while also ensuring that the output of nitrogen oxides and other types of regulated emissions remain below mandated levels. Moreover, varying load levels, varying ambient conditions, and many other types of operational parameters also may have a significant impact on overall gas turbine efficiency and emissions.

Lower emission levels of nitrogen oxides and the like may be promoted by providing for good mixing of the fuel stream and the air stream prior to combustion. Such premixing tends to reduce combustion temperature gradients and the output of nitrogen oxides. One method of providing such good mixing is through the use of a combustor with a number of micro-mixer fuel nozzles. Generally described, a micro-mixer fuel nozzle mixes small volumes of the fuel and the air in a number of micro-mixer tubes within a plenum before combustion.

Although current micro-mixer combustors and micro-mixer fuel nozzle designs provide improved combustion performance, the operability window for a micro-mixer fuel nozzle in certain types of operating conditions may be defined at least partially by concerns with dynamics and emissions. Specifically, the operating frequencies of certain internal components may couple so as to create a high or a low frequency dynamics field. Such a dynamics field may have a negative impact on the physical properties of the combustor components as well as the downstream turbine components. Given such, current combustor designs may attempt to avoid such operating conditions by staging the flows of fuel or air to prevent the formation of a dynamics field. Staging seeks to create local zones of stable combustion even if the bulk conditions may place the design outside of typical operating limits in terms of emissions, flammability, and the like. Such staging, however, may require time intensive calibration and also may require operation at less than optimum levels.

There is thus a desire for improved micro-mixer combustor designs. Such improved micro-mixer combustor designs may promote good mixing of the flows of fuel and air therein so as to operate at higher temperatures and efficiency but with lower overall emissions and lower dynamics. Moreover, such improved micro-mixer combustor designs may accomplish these goals without greatly increasing overall system complexity and costs.

SUMMARY OF THE INVENTION

The present application and the resultant patent thus provide a variable volume combustor for use with a gas turbine engine. The variable volume combustor may include a liner, a number of micro-mixer fuel nozzles positioned within the liner, and a linear actuator so as to maneuver the micro-mixer fuel nozzles axially along the liner.

The present application and the resultant patent further provide a method of operating a combustor in a gas turbine. The method may include the steps of positioning a number of micro-mixer fuel nozzles within a liner, maneuvering the micro-mixer fuel nozzles along the liner in a first direction so as to provide a first liner volume, and maneuvering the micro-mixer fuel nozzles along the liner in a second direction so as to provide a second liner volume. The first liner volume may provide a first reaction residence time and the second liner volume may provide a second reaction residence time.

The present application and the resultant patent further provide a variable volume combustor for use with a gas turbine engine. The variable volume combustor may include a liner, a number of micro-mixer fuel nozzles positioned within the liner, and a linear actuator so as to maneuver the micro-mixer fuel nozzles axially along the liner so as to change a volume of the liner.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
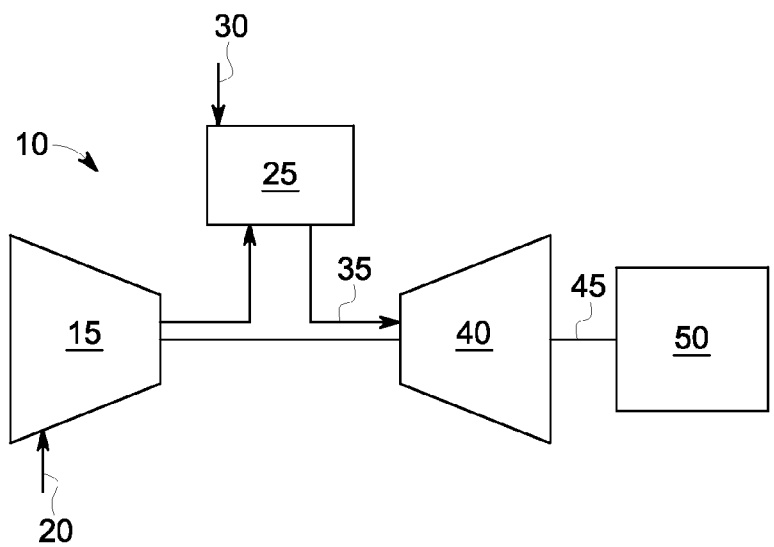
FIG. 1 a schematic diagram of a gas turbine engine showing a compressor, a combustor, and a turbine.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of the combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and combinations thereof. The gas turbine engine 10 may be any one of a number of different gas turbine engines offered by General Electric Company of Schenectady, New York, including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
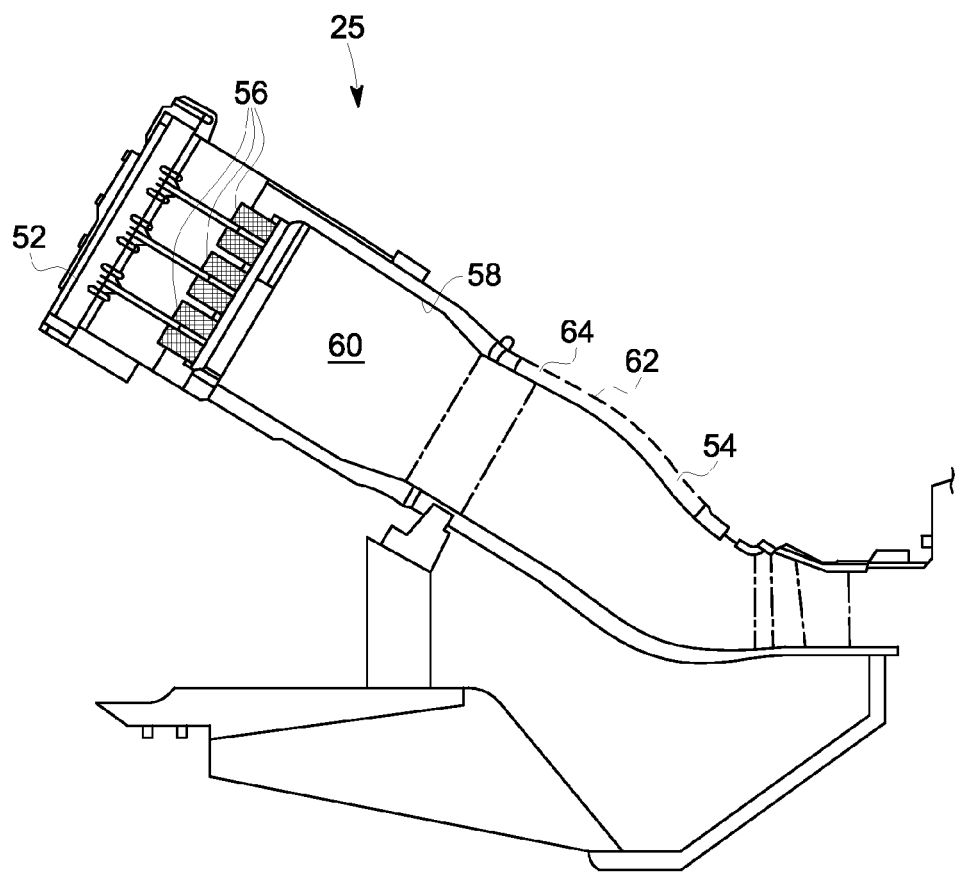
FIG. 2 is a schematic diagram of a combustor that may be used with the gas turbine engine of FIG. 1.

FIG. 2 shows a schematic diagram of an example of the combustor 25 as may be used with the gas turbine engine 10 described above and the like. The combustor 25 may extend from an end cover 52 at a head end to a transition piece 54 at an aft end about the turbine 40. A number of fuel nozzles 56 may be positioned about the end cover 52. A liner 58 may extend from the fuel nozzles 56 towards the transition piece 54 and may define a combustion zone 60 therein. The liner 58 may be surrounded by a flow sleeve 62. The liner 58 and the flow sleeve 62 may define a flow path 64 therebetween for the flow of air 20 from the compressor 15 or otherwise. Any number of the combustors 25 may be used herein in a can-annular array and the like. The combustor 25 described herein is for the purpose of example only. Combustors with other components and other configurations may be used herein.

Figure 3:
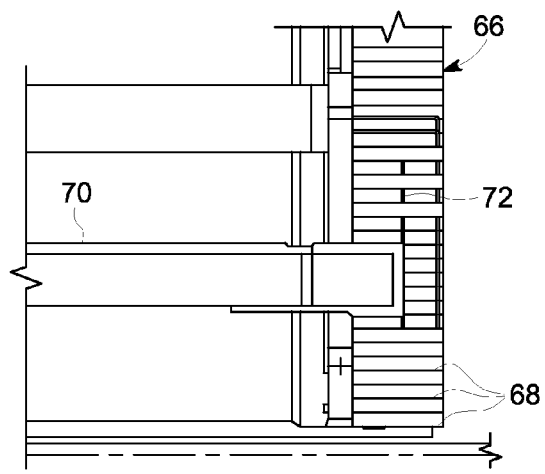
FIG. 3 is a schematic diagram of a portion of a micro-mixer fuel nozzle that may be used with the combustor of FIG. 2.

FIG. 3 shows a portion of a micro-mixer fuel nozzle 66 that may be used with the combustor 25 and the like. The micro-mixer fuel nozzle 66 may include a number of micro-mixer tubes 68 positioned about a fuel tube 70. The micro-mixer tubes 68 generally may have substantially uniform diameters and may be arranged in annular, concentric rows. Any number of the micro-mixer tubes 68 may be used herein in any size, shape, or configuration. The micro-mixer tubes 68 may be in communication with the flow of fuel 30 from the fuel tube 70 via a fuel plate 72 and the flow of air 20 from the compressor 15 via the flow path 64. A small volume of the flow of fuel 30 and a small volume of the flow of air 20 may mix within each micro-mixer tube 68. The mixed fuel-air streams may flow downstream for combustion in the combustion zone 60 and used in the turbine 40 as described above. Other components and other configurations may be used herein.

Figure 4:
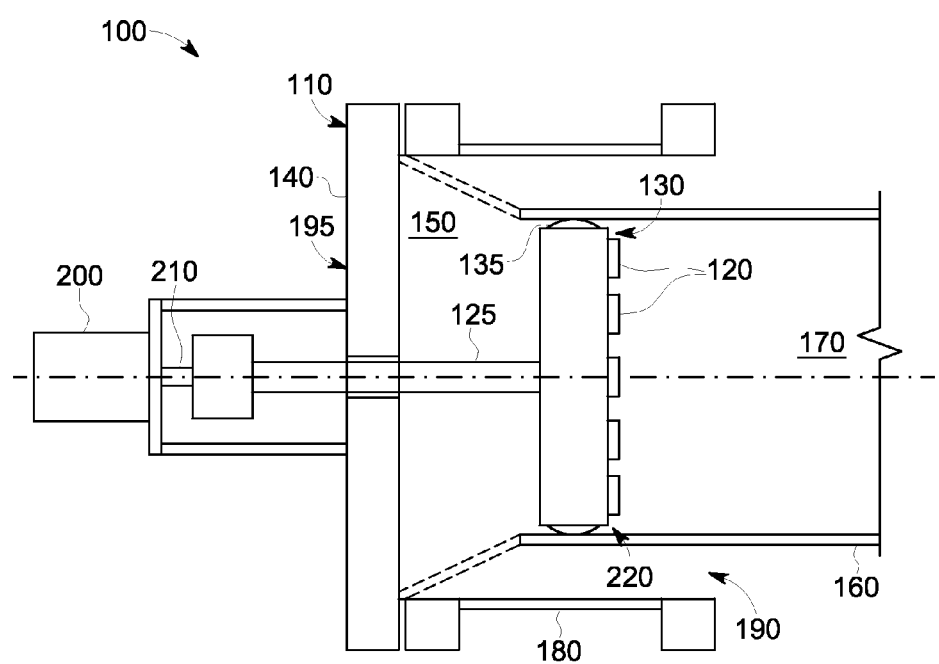
FIG. 4 is a schematic diagram of a micro-mixer combustor as may be described herein.

FIG. 4 shows an example of a combustor 100 as may be described herein. The combustor 100 may be a micro-mixer combustor 110 with any number of the micro-mixer fuel nozzles 120 and the like positioned therein. The micro-mixer fuel nozzles 120 may be similar to those described above. The micro-mixer fuel nozzles 120 may be sector shaped, circular shaped, and/or have any size, shape, or configuration. Likewise, the micro-mixer nozzles 120 may include any number of micro-mixer tubes therein in any configuration. The micro-mixer fuel nozzles 120 may be in communication with a common fuel tube 125. The common fuel tube 125 may carry one or more fuel circuits therein. The multiple fuel circuit thus may allow staging of the micro-mixer fuel nozzles 120. The micro-mixer fuel nozzles 120 may be mounted within a cap assembly 130 or a similar structure. The cap assembly 130 may have any size, shape, or configuration. The cap assembly 130 may be surrounded by a conventional seal 135 and the like.

Similar to that described above, the combustor 100 may extend from an end cover 140 at a head end 150 thereof. A liner 160 may surround the cap assembly 130 and the seal 135 with the micro-mixer fuel nozzles 120 therein. The liner 160 may define a combustion zone 170 downstream of the cap assembly 130. The liner 160 may be surrounded by a case 180. The liner 160, the case 180, and a flow sleeve (not shown) may define a flow path 190 therebetween for the flow of air 20 from the compressor 15 or otherwise. The liner 160, the combustion zone 170, the case 180, and the flow path 190 may have any size, shape, or configuration. Any number of the combustors 100 may be used herein in a can-annular array and the like. Other components and other configurations also may be used herein.

The combustor 100 also may be a variable volume combustor 195. As such, the variable volume combustor 195 may include a linear actuator 200. The linear actuator 200 may be positioned about the end cover 140 and outside thereof. The linear actuator 200 may be of conventional design and may provide linear or axial motion. The linear actuator 200 may be operated mechanically, electro-mechanically, piezo-electrically, pneumatically, hydraulically, and/or combinations thereof. By way of example, the linear actuator 200 may include a hydraulic cylinder, a rack and pinion system, a ball screw, a hand crank, or any type of device capable of providing controlled axial motion. The linear actuator 200 may be in communication with the overall gas turbine controls for dynamic operation based upon system feedback and the like.

The linear actuator 200 may be in communication with the common fuel tube 125 via a drive rod 210 and the like. The drive rod 210 may have any size, shape, or configuration. The common fuel tube 125 may be positioned about the drive rod 210 for movement therewith. The linear actuator 200, the drive rod 210, and the common fuel tube 125 thus may axially maneuver the cap assembly 130 with the micro-mixer nozzles 120 therein along the length of the liner 160 in any suitable position. The multiple fuel circuits within the common fuel tube 125 may allow for fuel nozzle staging. Other components and other configurations also may be used herein.

In use, the linear actuator 200 may maneuver the cap assembly 130 so as to vary the volume of the head end 150 with respect to the volume of the liner 160. The liner volume (as well as the volume of the combustion zone 170) thus may be reduced or increased by extending or retracting the micro-mixer fuel nozzles 120 along the liner 160. Moreover, the cap assembly 130 may be maneuvered without changing the overall system pressure drop. Typical combustor systems may change the overall pressure drop. Such a pressure drop, however, generally has an impact on cooling the components therein. Moreover, variations in the pressure drop may create difficulties in controlling combustion dynamics.

Changing the upstream and downstream volumes may result in varying the overall reaction residence times and, hence, varying the overall emission levels of nitrogen oxides, carbon monoxide, and other types of emissions. Generally described, reaction residence time directly correlates to liner volume and thus may be adjusted herein to meet the emission requirements for a given mode of operation. Moreover, varying the residence times also may have an impact on turndown and combustor dynamics in that overall acoustic behavior may vary as the head end and the liner volumes vary.

For example, a short residence time generally may be required to ensure low nitrogen oxides levels at base load. Conversely, a longer residence time may be required to reduce carbon monoxide levels at low load conditions. The combustor 100 described herein thus provides optimized emissions and dynamics mitigation as a tunable combustor with no variation in the overall system pressure drop.

Specifically, the combustor 100 provides the ability to vary actively the volumes herein so as to tune the combustor 100 to provide a minimal dynamic response without impacting on fuel staging.

Although the linear actuator 200 described herein is shown as maneuvering the micro-mixer fuel nozzles 120 in the cap assembly 130 as a group, multiple linear actuators 200 also may be used so as to maneuver individually the micro-mixer fuel nozzles 120 and to provide nozzle staging. In this example, the individual micro-mixer fuel nozzles 120 may provide additional sealing therebetween and with respect to the cap assembly 130. Rotational movement also may be used herein. Moreover, non-micro-mixer fuel nozzles also may be used herein and/or non-micro-mixer fuel nozzles and micro-mixer fuel nozzles may be used together herein. Other types of axial movement devices also may be used herein. Other component and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A variable volume combustor for use with a gas turbine engine, comprising:
   a liner;
   a plurality of micro-mixer fuel nozzles positioned within the liner, wherein the plurality of micro-mixer fuel nozzles is positioned within a cap assembly, wherein the plurality of micro-mixer fuel nozzles is in communication with a common fuel tube;
   a linear actuator attached to the common fuel tube so as to maneuver the cap assembly and the plurality of micro-mixer fuel nozzles axially along the liner; and
   a seal positioned between the cap assembly and the liner to create a seal between the liner and the cap assembly as the cap assembly moves axially along the liner.

2. The variable volume combustor of claim 1, wherein the plurality of micro-mixer fuel nozzles comprises a plurality of micro-mixer fuel tubes and a fuel plate.

3. The variable volume combustor of claim 1, wherein the common fuel tube comprises a plurality of fuel circuits therein.

4. The variable volume combustor of claim 1, wherein the linear actuator comprises a drive rod in communication with the common fuel tube for movement therewith.

5. The variable volume combustor of claim 1, wherein the linear actuator is positioned adjacent an end cover.

6. The variable volume combustor of claim 1, wherein maneuvering the plurality of micro-mixer fuel nozzles along the liner varies a liner volume.

7. The variable volume combustor of claim 1, wherein maneuvering the plurality of micro-mixer fuel nozzles along the liner varies a head end volume.

8. The variable volume combustor of claim 1, further comprising a plurality of linear actuators.

9. A method of operating a combustor in a gas turbine, comprising:
   positioning a plurality of micro-mixer fuel nozzles within a liner, wherein the plurality of micro-mixer fuel nozzles is positioned within a cap assembly, wherein the plurality of micro-mixer fuel nozzles is in communication with a common fuel tube that comprises a flow of fuel therein, wherein a flow of air enters an aft end of the plurality of micro-mixer fuel nozzles and mixes therein with the flow of fuel from the common fuel tube;
   maneuvering the cap assembly and the plurality of micro-mixer fuel nozzles along the liner in a first direction by a linear actuator attached to the common fuel tube to provide a first liner volume, wherein the common fuel tube is maneuverable by the linear actuator;
   maneuvering the cap assembly and the plurality of micro-mixer fuel nozzles along the liner in a second direction to provide a second liner volume; and
   positioning a seal between the cap assembly and the liner to create a seal between the liner and the cap assembly as the cap assembly moves axially along the liner.

10. The method of claim 9, wherein the first liner volume comprises a first reaction residence time and wherein the second liner volume comprises a second reaction residence time.

11. A variable volume combustor for use with a gas turbine engine, comprising:
   a liner;
   a plurality of micro-mixer fuel nozzles positioned within the liner, wherein the plurality of micro-mixer fuel nozzles is positioned within a cap assembly, wherein the plurality of micro-mixer fuel nozzles is in communication with a common fuel tube for movement therewith, wherein the common fuel tube comprises a flow of fuel therein, wherein a flow of air enters an aft end of the plurality of micro-mixer fuel nozzles and mixes therein with the flow of fuel from the common fuel tube;
   a linear actuator attached to the common fuel tube so as to maneuver the cap assembly and the plurality of micro-mixer fuel nozzles axially along the liner so as to change a volume of the liner; and
   a seal positioned between the cap assembly and the liner to create a seal between the liner and the cap assembly as the cap assembly moves axially along the liner.

12. The variable volume combustor of claim 11, wherein the plurality of micro-mixer fuel nozzles comprises a plurality of micro-mixer fuel tubes and a fuel plate.

13. The variable volume combustor of claim 11, wherein the linear actuator comprises a drive rod in communication with the common fuel tube for movement therewith.

\* \* \* \* \*